(12) United States Patent
Zhu (10) Patent No.: US 10,283,003 B2
(45) Date of Patent: May 7, 2019

(54) APPARATUS AND METHOD FOR HELPING ALZHEIMER PATIENTS

(71) Applicant: Stephen R Zhu, Cupertino, CA (US)

(72) Inventor: Stephen R Zhu, Cupertino, CA (US)

(*) Notice: Subject to any disclaimer, the term of this patent is extended or adjusted under 35 U.S.C. 154(b) by 76 days.

(21) Appl. No.: 15/700,102

(22) Filed: Sep. 9, 2017

(65) Prior Publication Data

US 2017/0372627 A1    Dec. 28, 2017

(51) Int. Cl.
G09B 5/00 (2006.01)
G06K 9/78 (2006.01)
G06K 9/00 (2006.01)
G09B 5/02 (2006.01)
G09B 29/10 (2006.01)
G06K 7/10 (2006.01)
G06K 19/07 (2006.01)
G09B 5/04 (2006.01)
G06F 3/147 (2006.01)
G06F 3/01 (2006.01)

(52) U.S. Cl.
CPC .......... *G09B 5/00* (2013.01); *G06K 7/10366* (2013.01); *G06K 9/00624* (2013.01); *G06K 9/78* (2013.01); *G06K 19/0723* (2013.01); *G09B 5/02* (2013.01); *G09B 5/04* (2013.01); *G09B 29/102* (2013.01); *G06F 3/01* (2013.01); *G06F 3/147* (2013.01)

(58) Field of Classification Search
CPC ....................................................... G09B 5/00
USPC .......................................................... 434/319
See application file for complete search history.

(56) References Cited

U.S. PATENT DOCUMENTS

| | | | |
|---|---|---|---|
| 2005/0148339 A1* | 7/2005 | Boman | G08B 13/1427 |
| | | | 455/456.1 |
| 2008/0018475 A1* | 1/2008 | Breed | G01S 13/878 |
| | | | 340/572.7 |
| 2017/0092090 A1* | 3/2017 | Lerner | G08B 13/2462 |

* cited by examiner

*Primary Examiner* — Thomas J Hong
(74) *Attorney, Agent, or Firm* — Jun He Law Offices P.C.; James J. Zhu (57) ABSTRACT

The present disclosure relates to an apparatus and a method for helping Alzheimer patients to locate their belonging by allowing the patients to attach to the belonging with a label which can be identified and located by a label identifier in a room. As a result, the patients are now able quickly find where the belonging are and their life quality can be improved by reducing their anxiety and frustration in finding the belongings.

16 Claims, 6 Drawing Sheets

APPARATUS AND METHOD FOR HELPING ALZHEIMER PATIENTS

TECHNICAL FIELD

The present disclosure generally relates to an apparatus and a method for helping Alzheimer patients.

BACKGROUND

Alzheimer's disease is a chronic neurodegenerative disease. A common symptom of an Alzheimer's patient is difficulty in remembering recent events or location of the patient's belongings. The patient then becomes frustrated and anxious in searching for their belongings. Therefore, there is a need to provide methods and systems for helping Alzheimer patients to easily find their belonging in a room or at home.

SUMMARY

According to one aspect of the present disclosure, there is provided an apparatus and a method for helping Alzheimer patients to locate their belonging by allowing the user to find his or her belongings in a room.

According to another aspect of the present disclosure, there is provided an apparatus for helping a person locating belongings in a space. The apparatus includes an input device configured for receiving an input (an instruction to find a belonging) from the person and turning the input into an input signal; a label identifier configured for identifying the presence and location of a label operably attached to the belonging upon receipt of the input signal and outputting an output signal containing information of the presence and location of the label; and an output device configured for informing the person of the presence and location of the belonging upon receipt of the output signal. In one embodiment, the apparatus further includes a camera which recognizes items or belongings in a room via artificial intelligence software and sends the information to the output device.

According to another aspect of the present disclosure, there is provided a method for helping a person locating belongings in a space. The method includes: inputting an input instruction to find the belonging into an input device which converts the input instruction into an input signal; communicating the input signal to a label identifier; identifying the presence and location of a label operably attached to the belonging upon receipt of the input signal by the label identifier, the label being related to the input instruction; forming an output signal containing information of the presence and location of the label; communicating the output signal to an output device; and informing the person of the presence and location of the belonging by the output device.

According to another aspect of the present disclosure, a pre-labeled label or pre-made label is provided to be related or operably linked to a belonging and the pre-labeled label can be linked to (e.g., adhered to or glued to) the belonging. Upon the detection of the pre-labeled label, the presence and location of the belonging can be presented.

According to another aspect of the present disclosure, an article of manufacture is provided to contain one pre-labeled label or a set of pre-labeled labels. A set of pre-labeled labels contain a first pre-labeled label and a second pre-labeled label, wherein the first pre-labeled label is related to a first belonging and the second pre-labeled label is related to a second belonging. The pre-labeled labels can be linked to (e.g., adhered to or glued to) their belonging respectively (the first label adhered to the first belonging and the second label adhered to the second belonging). After adhesion and detection of the pre-labels, the presence and location of the first and second belongings can be presented.

According to another aspect of the present disclosure, an input device can be in the same apparatus of the output device or in a different apparatus from the output device. An input device can be in the same space as the output device or in a different space as the output device. In certain embodiments, both input and output device are in the same space where the belonging to be detected locates. In certain embodiments, both input and output device are outside the space where the belonging to be detected locates. In certain embodiments, the input is in the same space where the belonging to be detected locates but the output device is outside the space. In certain embodiments, the output is in the same space where the belonging to be detected locates but the input device is outside the space.

According to another aspect of the present disclosure, there is provided an apparatus for helping a person locating belongings in a space. The apparatus includes an input device configured for receiving an input (an instruction to find a specific belonging) from the person and turning the input into an input signal; a camera configured to recognize items or belongings in a room via artificial intelligence software, identify the presence and location of the specific belonging and convert the information into an output signal; and an output device configured for informing the person of the presence and location of the specific belonging upon receipt of the output signal.

It should be understood that both the foregoing general description and the following detailed description are exemplary and explanatory only, and do not intend to limit the disclosure.

BRIEF DESCRIPTION OF THE DRAWINGS

The accompanying drawings, which are incorporated in and constitute a part of this specification, illustrate embodiments consistent with the disclosure, and together with the description, serve to explain the principles of the disclosure.

Through the above accompany drawings, the specific embodiments of the disclosure have been illustrated, and a more detailed description may be given as below. These drawings and the textual description are not intended to limit the scope of the concept of the disclosure in any manner, but to explain the concept of the disclosure to those skilled in the art with reference to particular embodiments.

DETAILED DESCRIPTION OF THE PREFERRED EMBODIMENTS

In the following, a detailed description may be given to exemplary embodiments, examples of which are illustrated in the accompany drawings. Where an accompany drawing is referred in the following description, the same number indicates same or similar elements in different accompany drawings, unless specified otherwise. The embodiments described in the following exemplary embodiments do not represent all of the embodiments in consistent with the present disclosure. On the contrary, they are only examples of apparatuses, terminal devices, servers and methods in consistent with some aspects of the present disclosure, as set forth in the appended claims.

Figure 1:
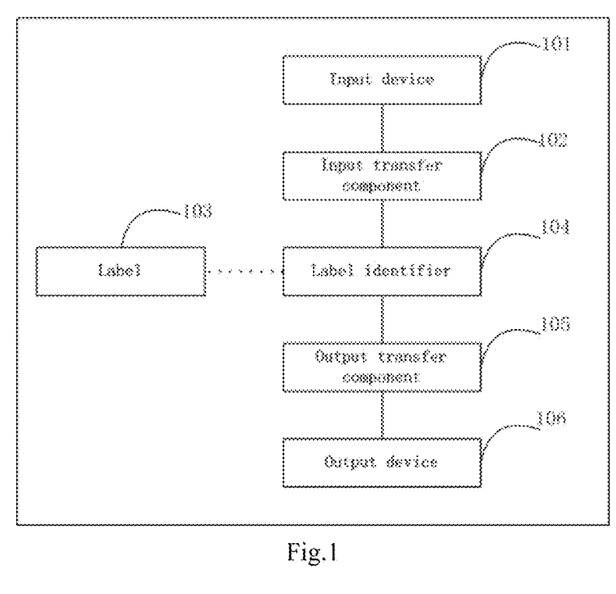
FIG. 1 is a block diagram showing an apparatus for locating belongings in a space according to an embodiment of the present disclosure.

FIG. 1 shows an apparatus for locating belongings in a space according to an embodiment of the present disclosure. As can be seen from FIG. 1, the apparatus 100 may include: an input device 101, an input transfer component 102, a label 103, a label identifier 104, an output transfer component 105, and an output device 106.

The input device 101 is configured for receiving an input instruction from a person in desire of locating a belonging in a space and turning the input instruction into an input signal. For example, the input device maybe a phone, a pad, a computer, an LED, a screen, a voice activated device, a motion activated panel, a touch screen, a BMI (Brain Matter Interface), an AI, a TV and the like.

Figure 2:
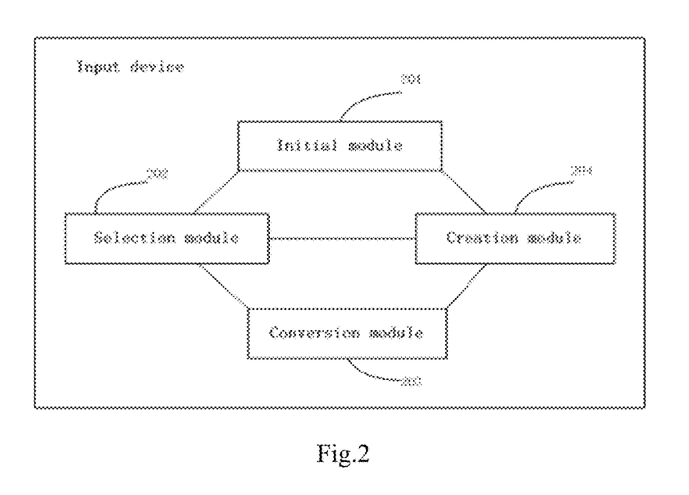
FIG. 2 is a block diagram showing the components in an input device according to an embodiment of the present disclosure.

FIG. 2 shows an input device in more detail according to an embodiment of the present disclosure. As is shown in FIG. 2, the input device 101 may further include: an initiate module 201, a selection module 202 and a conversion module 203.

The initiate module 201 is configured for initiating a procedure for locating a belonging in a space. The user may initiate the procedure via touch control, voice control and the like. Once the procedure is initiated, the user may further input an instruction for locating the belonging.

The selection module 202 may be pre-stored with a plurality of names/unique IDs, each corresponding to a common item, such as a key, a wallet or the like. During use, the user may select the name/unique ID corresponding to the belonging he/she is looking for from a plurality of pre-stored names/unique IDs via a gesture, a touch, a typing, a voice, a brain function and the like. In this way, the input instruction is received by the input device. In some embodiments, the selection module 202 may be implemented as a look-up table containing respective relationships between the name/unique IDs and the input instructions.

The conversion module 203 is configured for converting the input instruction of the user into an input signal. The input signal contains information of the item that the user is looking for, for example, the unique ID of the item. The conversion from the input instruction into the input signal may be assisted by the selection module 202.

As is shown in FIG. 2, the input device 101 may further include a creation module 204. The creation module is configured for allowing the user to add new names/unique IDs corresponding to different items. For example, the user may type the name/unique ID of the new item and the creation module may store the name/unique ID. After creating the name of the new item, the creation module may further store the name into the selection module, so that the user may directly select the name/unique ID during future use.

Figure 3:
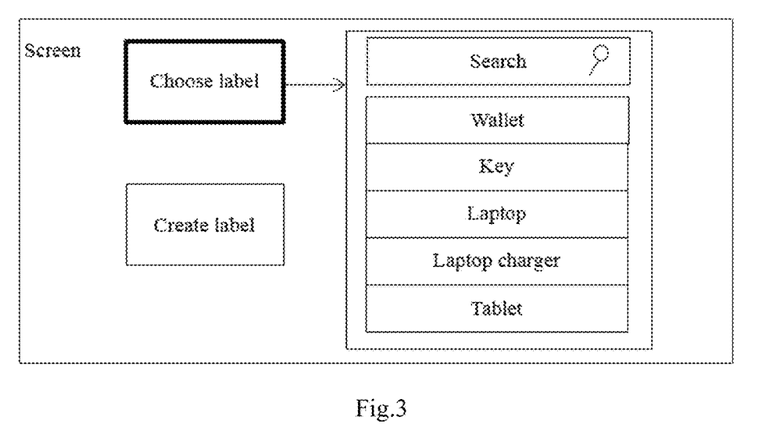
FIG. 3 shows an example of a user interface of an input device of the apparatus according to an embodiment of the present disclosure.

FIG. 3 shows an example of a user interface of an input device of the apparatus according to an embodiment of the present disclosure. In this example, the input device is a TV. When a user wants to find a specific belonging, he/she may initiate the procedure by selecting a specific APP on the TV screen via a TV remote. Then, a plurality of names corresponding to different items will be displayed on the screen. If the name of the item that the user is looking for is already listed, the user may input an instruction to look for that item by selecting the name directly. If not, the user may need to type in the letters of the name of that item using the TV remote so as to create a new choice of item and therefore input a corresponding instruction. The input device will then convert the input instruction into an input signal for later use.

Returning to FIG. 1, the input transfer component 102 is configured for transferring the input signal to a label identifier 104. The input transfer component 102 may be equipped within the input device 101, or may be a separate component.

The label 103 is specifically related to a corresponding item or a belonging that the user may be looking for. The label may include an RFID (radio-frequency identification) tag or label, which carries information regarding the unique ID of the corresponding item or belonging. It should be understood that the label may include other identification marks as long as it may be identified by a label identifier 104. The RFID label can UHF (Ultra High Frequency) tag, or a passive RFID, or an active RFID. The belonging herein is a household goods or product or an item that a user often use but may not be easily identified once placed in a room, including but not limited to currency, a wallet, a passport, a card, a key, a notepad, a book, a medicine bottle, a rubber band, a toothbrush, a bag, a pair of shoes, scissors, a needle, a bottle, a tape, a light bulb, a battery, Band-Aids, a UBS drive, a DVD or CD, a hairdryer, a watch, a floss, a lipstick, a dice, a ball, a container, a phone, a pad, a camera, a tool (e.g., a screwdriver, a hammer, a wrench, a nail, a picture hanger), an antique, an art object, a painting, a photo, a musical instrument, a toy, a jewelry (e.g., a necklace, a ring, an earring, a watch, a bracelet), a pet stuff, or the like.

The label 103 may be premade or pre-labelled to be directed to the item, so that the user of the apparatus won't have to make labels by themselves. For example, the label may already incorporate with an RFID label with a unique ID or a mark. During use, the user would only have to attach or adhere the pre-made label onto the designated item, for example by adhesive, and then input the unique ID of the label into the input device. In this way, the unique ID is linked to the designated item. When initiating the locating procedure, the user may type in the unique ID as mentioned-above so as to input an instruction to look for the designated item. The label identifier 104 may then receive an input signal with information regarding the unique ID.

The label 103 may also be programmed or adjusted to be directed to the item. For example, a user may link a label (with a specific RFID number) to a designated belonging of interest. The user can later re-programmed or modify the linkage of the label to another belonging of interest. In this case, unlike pre-made or pre-labeled labels which has been associated to respective belongings (via the marks), not-pre-made labels can be reused or re-linked to different belongings based on the needs of the user. Alternatively, even for the pre-made labels, the mark can be cleaned or peeled off from the pre-made labels and these labels can then become re-programmable or re-linked.

The label identifier 104 is configured for receiving the input signal from the input transfer component 102, and identifying the presence and location of the corresponding label 103. In other words, after extracting the unique ID in the input signal, the label identifier 104 may communicate with the label 103 with the ID, and then locate the label 103. Then, the label identifier 104 may generate an output signal based on the information of the presence and location of the label 103.

In order to communicate with the label 103, the label identifier 104 includes means to identify the identification mark in the label 103. For example, in a case where the label 103 includes an RFID label, the label identifier 104 may be an RFID reader. In another example, the label identifier 104 may include a sensor for determining the presence of the label 103.

Figure 4:
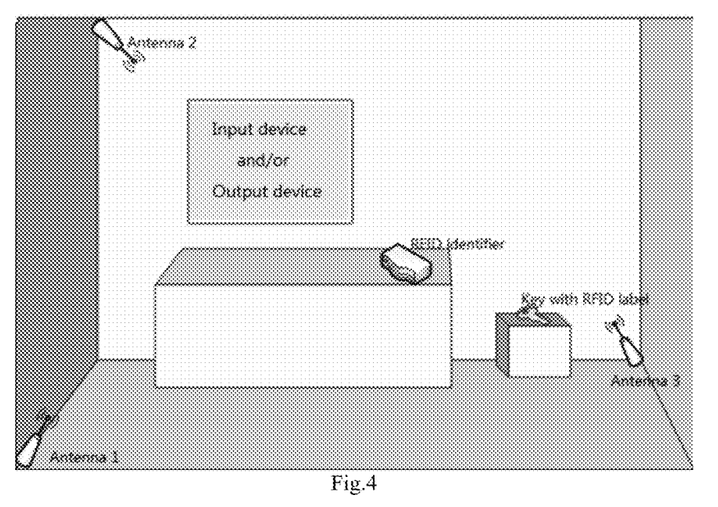
FIG. 4 shows an example where three antennas are communicated with an label identifier according to an embodiment of the present disclosure.

In order to locate the label 103, the label identifier 104 may be equipped with at least one antenna. FIG. 4 shows an example of the apparatus where three antennas are communicated with the label identifier via Wi-Fi for example. In this example, the space where the item resides is a room. In some other examples, the space where the item resides may be an open space such as a playground or the like.

In the example shown in FIG. 4, the TV is used as the input device, and the belonging that the user is looking for is a key incorporated with a RFID label. During the locating procedure, the user will first initiate the procedure and the TV screen will display a user interface as shown in FIG. 3, for example. The user will then choose the name of the item that he is looking for (i.e. key) via the TV remote, and the TV will transfer this input into an input signal. The input signal will then be transferred to the label identifier. The label identifier will first extract the unique ID corresponding to the designated item from the input signal, and then send out a signal to look for the label with that unique ID. This signal will be sent out from three different antennas, each connected to the label identifier, located around the room. The locations of the antennas in the room is predetermined or stored. The signal will reach the identification inside the label, in this case the RFID label, and the RFID label will send back a signal to each antenna. Each antenna will calculate the approximate distance from the label to itself based on the time taken for the signal to return to the antenna. Each antenna will also the approximate angle from the direction the antenna is pointing to the label, so that the label identifier can use trigonometry to find the exact location of the RFID label. In this way, the label identifier may locate the label, and therefore generate an output signal with information of the presence and location of the item. The output signal will then be transmitted to the user, as will be described in detail below. In this example, the presence and location of the key will be presented on the TV screen.

In certain embodiments, the location of object or the label can be identified by a camera scanning the room. The camera will be able to scan the room and show a 3D mapping of the room. When the camera scans the room, an artificial intelligence (AI) or machine learning software will recognize items and objects within the room. If the object is identified, the AI software will identify and send the information to the output device which then informs the user exactly where the object is. If the camera does not see the object (e.g., a key) which is hidden among other objects (books and papers), the camera will use the RFID information about the location of the object and identify objects adjacent to the RFID via the AI software. The information of the adjacent objects is also sent to the output device and notifies the user that the RFID label or the item (the key) is among the books and paper in a particular location of the room so as to easily find the item (the key) for the user.

In some embodiments, the location of the label (i.e. the item being looked for) may be presented in a two-dimensional format, e.g. in a plane map. In such case, at least two antennas may be located in the space. In some embodiments, a remote antenna may be equipped with the apparatus, with some auxiliary relative positioning means (e.g. an inertial sensor) affixed to the antenna. The remote antenna may communicate with the label for at least two or three times at different locations, and then the trigonometry can be implemented to determine the locations of the label. It will appreciated by those skilled in the art that the determination of the location of the label using the label identifier is exemplary, any other methods for determining the location of a label can be used in the apparatus of the present disclosure.

In some embodiments, each antenna may have a range of around 4 meters. In order to gain a 3D mapping of where an item is, at least 3 antennas are needed to be attached in order to determine the exact location of that item. The range of the antenna may be adjusted depending on actual needs. Some materials may absorb part of the sent and received signal, so having more than one antenna is necessary.

The antennas may be specifically designed for the implantation of the apparatus. Alternatively, antennas of some existing appliances can be used. For example, a wireless network router or any other wireless devices with an antenna can be used.

In another example, the label identifier 104 may include a 3D mapping device, configured to determine the location of the label in a 3D space setting. For example, the 3D mapping device currently available on the market may include Structure Sensor, GeoSlam, FARO Focus, etc.

Returning to FIG. 1, the output transfer component 105 is configured for transferring the output signal to an output device 106. The output transfer component 105 may be equipped in the label identifier 104, or it may be a separate component.

The output device 106 is configured for receiving the output signal and informing the user of the presence and location of the belonging. The user may receive the output signal via a text or image displaying on the screen of the output device, an acoustic message, a GUI or the like. The output device may be a phone, a pad, a computer, an LED, a screen, a voice activated device, a motion activated panel, a touch screen, a BMI (Brain Matter Interface), an AI, and a TV.

In one situation, both the input device and output device may not be in the same room or home as the item that the user is looking for. For example, the user (e.g., an Alzheimer patient) is in a room looking for his or her items. The user calls a friend or relative who is not in the room or away from the home. The friend or relative can use an input/output device (e.g., a phone, a pad, or a computer, not in the user's possession but under the friend's or relative's possession or control) which remotely communicates with the sensor system inside the room and identifies the presence and location of the item that the user is looking for. Upon the information in the input/output device, the users learns the location of the item in the room (e.g., during the call with the friend or relative). For another example, the user is away from a room and wants to know where the user's belonging is in the room. The user can use his/her input/output device under the user's immediate control (e.g., the user may carry the device) and identify the belonging in the room.

In another situation, both the input device and output device may be in the same room as the item that the user is looking for. For example, a user is at home or in a room but have difficulty in remembering the exact location of the belonging that he or she is looking for. He or she can input an instruction into an input device to search for the belonging in the room or home, and an output device (which may be the same or be different from the input device) can inform him or her the exact location of the belonging.

In yet another situation, the input device may be in the same room/home as the item that the user is looking for, while the output device may not be in the room/home. For example, a family member of an Alzheimer patient may ask the patient the location of a specific item, which the patient has difficulty in remembering. The patient at home may input an instruction into an input device to search for the item, and the family member may have a corresponding output device which shows the member the presence and location of the item directly. Alternatively, the patient may input the search instruction into the input device located at home, the patient may forget how to use the output in the room (or there are some issue with the output device). The user then calls the family member who has a remote output device (a second output device). The sensor system communicates with the remote output device and send the presence and location of the item to the remote device. The family member then tell the location of the item in the room or at home to the patient via phone call or other means (e.g., texting).

In yet another situation, the input device may not be in the same room as the item that the user is looking for, while the output device may be in the room. For example, an Alzheimer patient may call his family member the location of a specific item inside the house. The family member of the patient may input an instruction into an input device in the member's possession (where the input device is not at home or in the room but communicates with the sensor system at home) to search for the item for the patient, and the patient at home may have a corresponding output device which shows the user the exact location of the item. In certain embodiment, a first input device may still be in the room where the patient may not be able to use and the device in the family member's possession is a second input device.

Moreover, the apparatus may mask the output signal (or assign a passcode) to the output device, so that the information about the presence and location of the belonging is presented once unlocked (or with correct passcode). In this case, the apparatus may provide the user a chance to protect the information of the belonging (e.g., wallet).

Figure 5:
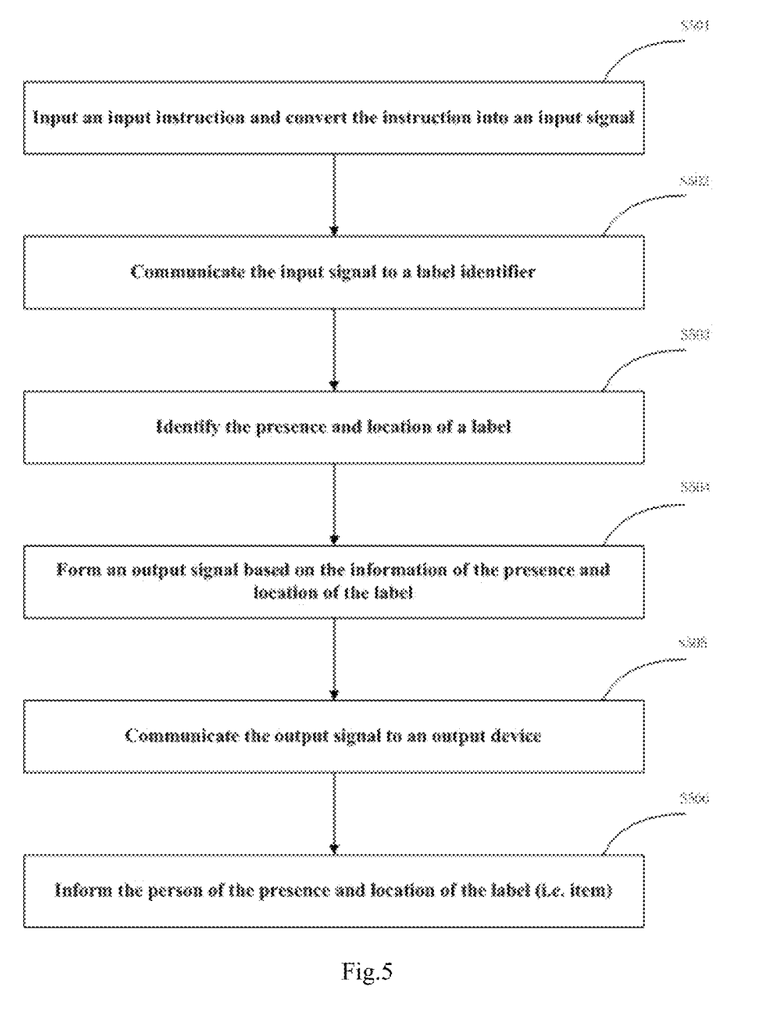
FIG. 5 is a flow chart showing a method for locating belongings in a space according to an embodiment of the present disclosure.

As is shown FIG. 5, the method for helping a person locating a belonging in a space includes the following steps:

In Step 501, an input instruction to find an item (for example, money, a wallet, a passport) in a space is input into an input device by a user, wherein the input device converts the input instruction into an input signal. The input instruction may include information of the item, for example, the name or the unique ID of the item. The input signal may include the unique ID of the item that the user is looking for. In addition, the input instruction can be inputted by touch, gesture, typing, voice, or brain function.

In Step 502, the input signal is communicated to a label identifier. For example, the input signal may be transferred to the label identifier by an input transfer component.

In Step 503, the presence and location of a label with the unique ID is identified by the label identifier upon receipt of the input signal. The label is operably linked to the item and may communicate with the label identifier. In one example the label identifier may use at least one antenna to determine the location of the label. In another example, the label identifier may include a sensor to determine the presence of the label and a 3D mapping detector to determine the location of the label.

In Step 504, an output signal containing information of the presence and location of the label, therefore the item is generated. For example, the output signal may be generated by the label identifier.

In Step 505, the output signal is communicated to an output device. For example, the output signal may be transferred to the output device by an output transfer component.

In Step 506, the presence and location of the item is sent the user via the output device. The output device may be the same as the input device, or may be different from the input device.

In addition, the method may further include a step for creating a label (not shown), wherein the user may input the name of the item that he/she is looking for into the input device.

Figure 6:
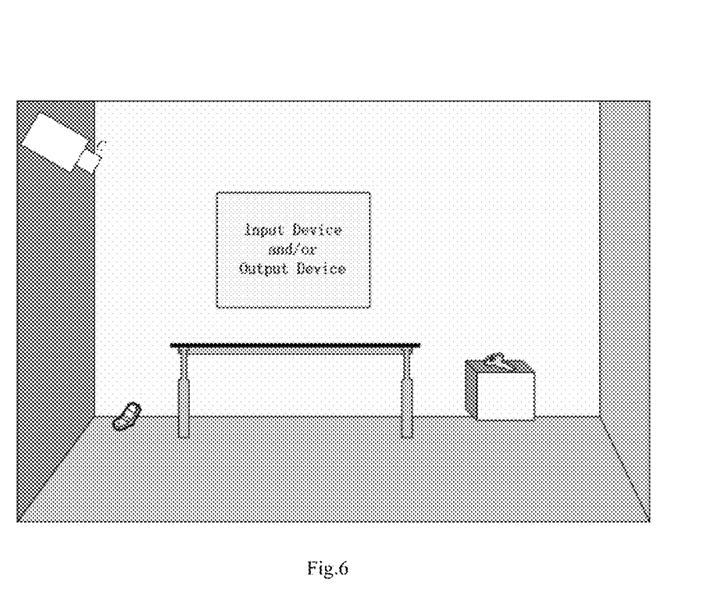
FIG. 6 shows an example where a camera is used for recognizing and locating belongings in a room via artificial intelligence software according to an embodiment of the present disclosure.

FIG. 6 shows an example where a camera is used for recognizing and locating belongings in a room via artificial intelligence software. As shown in FIG. 6, the apparatus includes an input device configured for receiving an input (an instruction to find a specific belonging) from the person and turning the input into an input signal; a camera configured to recognize items or belongings in a room via artificial intelligence software, identify the presence and location of the specific belonging and convert the information into an output signal; and an output device configured for informing the person of the presence and location of the specific belonging upon receipt of the output signal.

It is contemplated that if the specific belonging to be located can be easily identified by camera or scanning through object recognition and/or machine learning software, then the system (e.g., as disclosed in FIG. 6) comprising an input device, a camera and an output device may be sufficient to help a user to locate the belonging.

However, in many situations, a specific belonging may be hidden among other objects or belongings, in which case the system (e.g., as disclosed in FIG. 4) comprising an input device, a label identifier, a label attached to a belonging, and an output device can help a user. The system can further include a camera capable of scanning and recognizing objects adjacent to or covering the label (or the label/belonging). The information can then be sent to the output device which, in addition to showing the location of the belonging, informs the user the adjacent objects surrounding the belongings to ease the finding of the belonging.

It is contemplated that a plurality of label identifiers (e.g., a first label identifier and a second label identifier) can be used in a room to identify the presence and location of the label (and the associated belonging), via measuring the relative distance and direction between the label and each identifier. It is also contemplated that a plurality of pre-existing labels (e.g., a first pre-existing label and a second pre-existing label) can be used to attach to known locations (e.g., each corner) of a room so that a label identifier can scan and map the room by identifying these pre-existing and localized labels, and afterwards, when a pre-labeled belonging is to be located, the label identifier can scan the room and measure the relative distance and direction among the pre-labeled label and pre-existing labels so as to determine the location of the pre-labeled label (as well as the associated belonging). It is further contemplated that a plurality of label identifiers and a plurality of pre-existing labels are used in a same room to constitute a multiplex system so that a pre-labeled label associated with a belonging can be located via measuring the relative direction and distance among the label identifiers, among the pre-existing labels, among the relationship between the pre-labeled label and the multiplex system.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It may be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. An apparatus for helping a person locating a belonging in a room, comprising:
   an input device configured for receiving an input related to the belonging from the person and turning the input into an input signal;
   an identifier configured for identifying the presence and location of the belonging upon receipt of the input signal, and outputting an output signal containing information of the presence and location of the belonging, wherein the identifier comprises
      a sensor configured for determining the presence and location of a label operably attached to the belonging, said sensor being connected to three antennas located in the room, wherein the locations of the three antennas in the room are predetermined, and wherein the three antennas are communicated with the label, and
      a camera configured for scanning the room to show a 3D map of the room and for recognizing the belonging or an object adjacent to the belonging using an artificial intelligence or machine learning software; and
   an output device configured for informing the person of the presence and location of the belonging upon receipt of the output signal.

2. The apparatus of claim 1, further comprising:
   an input transfer component configured for transferring the input signal to the identifier.

3. The apparatus of claim 1, further comprising:
   an output transfer component configured for transferring the output signal to the output device.

4. The apparatus of claim 1, wherein the input is selected from the group consisting of gesture, touch, typing, voice or brain function.

5. The apparatus of claim 1, wherein the input device is selected from the group consisting of TV, LED, PAD, phone, computer, voice activated device, touch screen, BMI (Brain Matter Interface), and motion activated panel.

6. The apparatus of claim 1, wherein the output device is selected from the group consisting of TV, LED, PAD, phone, computer, voice activated device, touch screen, BMI (Brain Matter Interface), and motion activated panel.

7. The apparatus of claim 1, wherein the output device and the input device are the same device.

8. The apparatus of claim 1, wherein the label is pre-made and adhered to the belonging.

9. The apparatus of claim 1, wherein the input device and/or the output device are outside the room.

10. The apparatus of claim 1, wherein the input device and/or the output device are inside the room.

11. The apparatus of claim 1, wherein the sensor is an RFID reader.

12. The apparatus of claim 11, wherein the label is an RFID chip.

13. The apparatus of claim 1, wherein the belonging is a personal item selected from the group consisting of currency, a wallet, a passport, a card, a key, a notepad, a book, a medicine bottle, a rubber band, a toothbrush, a bag, a pair of shoes, scissors, a needle, a bottle, a tape, a light bulb, a battery, Band-Aids, a UBS drive, a DVD or CD, a hairdryer, a watch, a floss, a lipstick, a dice, a ball, a container, a phone, a pad, a camera, a tool, an antique, an art object, a painting, a photo, a musical instrument, a toy, a jewelry, and a pet stuff.

14. The apparatus of claim 1, wherein the information of the presence and location of the belonging is presented to the person by GUI, image, or voice.

15. A method for helping a person locating a belonging in a room, comprising:
   inputting an input instruction to find the belonging into an input device which converts the input instruction into an input signal;
   communicating the input signal to an identifier, said identifier comprising
      a sensor configured for determining the presence and location of a label operably attached to the belonging, said sensor being connected to three antennas located in the room, wherein the locations of the three antennas in the room are predetermined, and wherein the three antennas are communicated with the label, and
      a camera configured for scanning the room to show a 3D map of the room and for recognizing the belonging or an object adjacent to the belonging using an artificial intelligence or machine learning software;
   identifying the presence and location of the belonging upon receipt of the input signal by the identifier;
   forming an output signal containing information of the presence and location of the belonging;
   communicating the output signal to an output device; and
   informing the person of the presence and location of the belonging by the output device.

16. The method of claim 15, further comprises: creating a label name corresponding to the belonging that the person is looking for into the input device.

* * * * *